United States Patent
Upadhyay et al.

(10) Patent No.: US 11,455,213 B2
(45) Date of Patent: Sep. 27, 2022

(54) METHOD AND SYSTEM FOR PARALLEL DATA TRANSMISSION AND COOPERATING BACKUPS

(71) Applicant: EMC IP Holding Company LLC, Hopkinton, MA (US)

(72) Inventors: Navneet Upadhyay, Ghaziabad (IN); Rejith Mohan M, Bengaluru (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 276 days.

(21) Appl. No.: 16/782,097

(22) Filed: Feb. 5, 2020

(65) Prior Publication Data
US 2021/0240572 A1 Aug. 5, 2021

(51) Int. Cl.
G06F 11/00 (2006.01)
G06F 11/14 (2006.01)
G06F 9/52 (2006.01)

(52) U.S. Cl.
CPC .......... G06F 11/1458 (2013.01); G06F 9/526 (2013.01); G06F 11/1453 (2013.01)

(58) Field of Classification Search
CPC ............. G06F 11/1458; G06F 11/1451; G06F 11/1461
See application file for complete search history.

(56) References Cited

U.S. PATENT DOCUMENTS

| | | | | |
|---|---|---|---|---|
| 5,956,712 A * | 9/1999 | Bennett | ............... | G06F 16/1774 |
| 6,330,560 B1 * | 12/2001 | Harrison | ................. | H04L 41/28 707/704 |
| 6,513,351 B2 * | 2/2003 | Clark | .................. | E05B 15/0093 70/101 |
| 6,516,351 B2 * | 2/2003 | Borr | ..................... | G06F 16/1774 709/229 |
| 6,571,276 B1 * | 5/2003 | Burns | ................. | G06F 16/1774 709/212 |
| 7,714,352 B2 * | 5/2010 | Shimoida | ............ | H01L 29/0619 257/135 |
| 7,831,974 B2 * | 11/2010 | Huston | ................... | G06F 9/526 718/104 |
| 9,807,468 B2 * | 10/2017 | Yoo | ..................... | H04N 21/6125 |
| 11,204,892 B2 * | 12/2021 | George | ................. | G06F 16/128 |
| 2004/0133577 A1 * | 7/2004 | Miloushev | ............ | H04W 4/027 |
| 2004/0133606 A1 * | 7/2004 | Miloushev | .......... | G06F 16/1824 |

(Continued)

Primary Examiner — Amine Riad
(74) Attorney, Agent, or Firm — Chamberlain, Hrdlicka, White, Williams & Aughtry

(57) ABSTRACT

In general, the invention relates to a method for performing operations. The method includes protecting a database includes detecting a first trigger event for a first backup operation targeting an user asset of a client device of client devices, wherein the first trigger event specifies first metadata associated with the first backup operation, acquiring a first byte-range lock associated with a backup type specified in the first metadata in an asset lock file associated with the user asset, acquiring a second byte-range lock of the asset lock file that is associated with a storage mounting operation, after acquiring the first byte-range lock and the second byte-range lock, mounting a backup storage to the client device using the first metadata, unlocking the second byte-range lock, and performing, after unlocking the second byte-range lock, the first backup operation on the user asset.

20 Claims, 11 Drawing Sheets

(56) References Cited

U.S. PATENT DOCUMENTS

2004/0133607 A1\* 7/2004 Miloushev .......... H04L 67/1008
2004/0133652 A1\* 7/2004 Miloushev .......... G06F 11/1076
709/214

\* cited by examiner

METHOD AND SYSTEM FOR PARALLEL DATA TRANSMISSION AND COOPERATING BACKUPS

BACKGROUND

Database protection defines the process of protecting database data using a secondary storage. More specifically, protection of the database data often entails replicating database data, sending the replicated data to a secondary storage across a network, and storing the replicated data on the secondary storage.

SUMMARY

In general, in one aspect, the invention relates to a method for performing operations. The method includes detecting a first trigger event for a first backup operation targeting an user asset of a client device of client devices, wherein the first trigger event specifies first metadata associated with the first backup operation, acquiring a first byte-range lock associated with a backup type specified in the first metadata in an asset lock file associated with the user asset, acquiring a second byte-range lock of the asset lock file that is associated with a storage mounting operation, after acquiring the first byte-range lock and the second byte-range lock, mounting a backup storage to the client device using the first metadata, unlocking the second byte-range lock, and performing, after unlocking the second byte-range lock, the first backup operation on the user asset.

In general, in one aspect, the invention relates to a system that includes a processor and a client protection agent, which when executed by the processor performs a method. The method comprising detecting a first trigger event for a first backup operation targeting an user asset of a client device of client devices, wherein the first trigger event specifies first metadata associated with the first backup operation, acquiring a first byte-range lock associated with a backup type specified in the first metadata in an asset lock file associated with the user asset, acquire a second byte-range lock of the asset lock file that is associated with a storage mounting operation, after acquiring the first byte-range lock and the second byte-range lock, mounting a backup storage to the client device using the first metadata, unlock the second byte-range lock, and performing, after unlocking the second byte-range lock, the first backup operation on the user asset.

In general, in one aspect, the invention relates to a non-transitory computer readable medium which includes computer readable program code, which when executed by a computer processor enables the computer processor to perform a method. The method includes detecting a first trigger event for a first backup operation targeting an user asset of a client device of client devices, wherein the first trigger event specifies first metadata associated with the first backup operation, acquiring a first byte-range lock associated with a backup type specified in the first metadata in an asset lock file associated with the user asset, acquiring a second byte-range lock of the asset lock file that is associated with a storage mounting operation, after acquiring the first byte-range lock and the second byte-range lock, mounting a backup storage to the client device using the first metadata, unlocking the second byte-range lock, and performing, after unlocking the second byte-range lock, the first backup operation on the user asset.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-7, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for performing parallel data transmission and cooperative database backup operations. Specifically, one or more embodiments of the invention enables allowable backup operations, or portions thereof, to be performed concurrently, thereby increasing database backup protection efficiency and decreasing time of database backup operation execution. In one or more embodiments of the invention, an asset lock file may be used to facilitate the concurrent performance of the allowable backup operations.

Figure 1A:
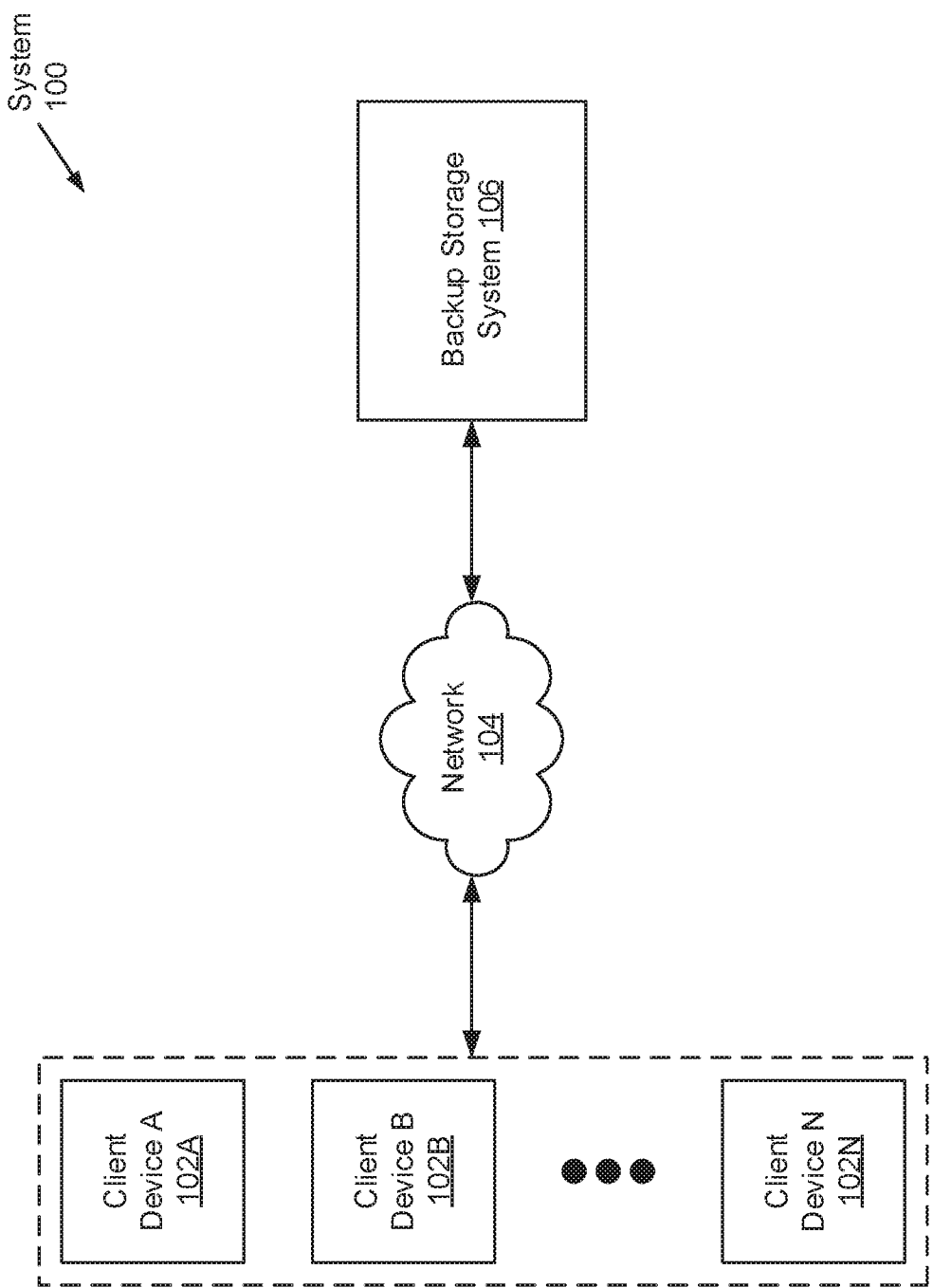
FIG. 1A shows a system in accordance with one or more embodiments of the invention.

FIG. 1A shows a system in accordance with one or more embodiments of the invention. The system (100) may include one or more client devices (102A-102N) operatively connected to a backup storage system (106). Each of these system (100) components is described below.

In one embodiment of the invention, the above-mentioned system (100) components may operatively connect to one another through a network (104) (e.g., a local area network (LAN), a wide area network (WAN) such as the Internet, a mobile network, etc.). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components. Moreover, the above-mentioned system (100) components may communicate with one another using any combination of wired and/or wireless communication protocols.

In one embodiment of the invention, a client device (102A-102N) may represent any physical appliance or computing system designed and configured to receive, generate, process, store, and/or transmit digital data, as well as to provide an environment in which one or more computer programs may execute thereon. The computer programs (not shown) may, for example, implement large-scale and complex data processing; or implement one or more services offered locally or over the network (104). Further, in providing an execution environment for any computer programs installed thereon, a client device (102A-102N) may include and allocate various resources (e.g., computer processors, memory, storage, virtualization, network bandwidth, etc.), as needed, to the computer programs and the tasks (or processes) instantiated thereby. One of ordinary skill will appreciate that a client device (102A-102N) may perform other functionalities without departing from the scope of the invention. Examples of a client device (102A-102N) may include, but are not limited to, a desktop computer, a laptop computer, a server, a mainframe, or any other computing system similar to the exemplary computing system shown in FIG. 7. Moreover, client devices (102A-102N) are described in further detail below with respect to FIG. 1B.

In one embodiment of the invention, the backup storage system (106) may represent a data backup, archiving, and/or disaster recovery storage system. The backup storage system (106) may be implemented using one or more servers (not shown). Each server may refer to a physical server, which may reside in a datacenter, or a virtual server, which may reside in a cloud computing environment. Additionally or alternatively, the backup storage system (106) may be implemented using one or more computing systems similar to the exemplary computing system shown in FIG. 7. Furthermore, the backup storage system (106) is described in further detail below with respect to FIG. 1C.

While FIG. 1A shows a configuration of components, other system (100) configurations may be used without departing from the scope of the invention.

Figure 1B:
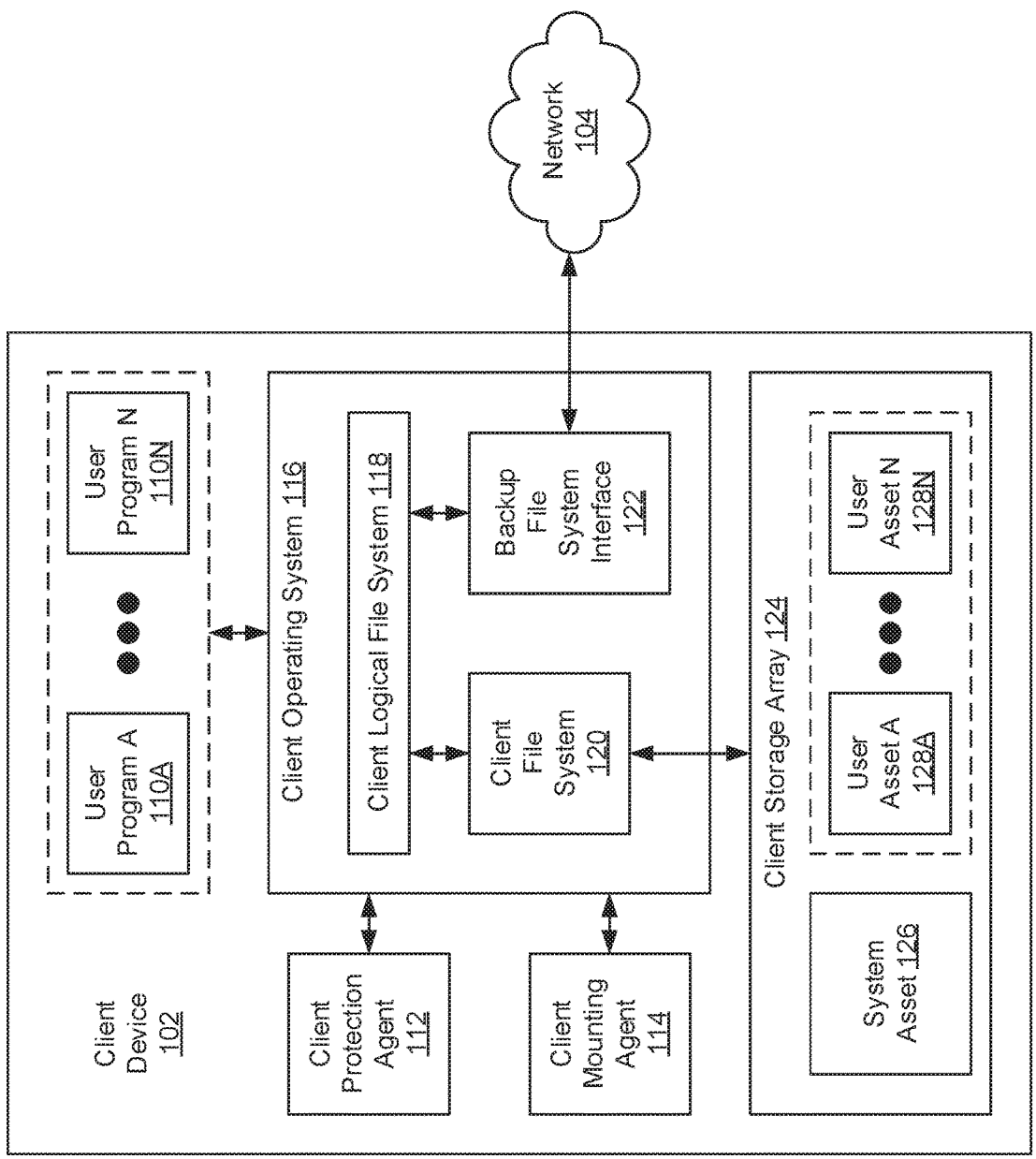
FIG. 1B shows a client device in accordance with one or more embodiments of the invention.

FIG. 1B shows a client device in accordance with one or more embodiments of the invention. The client device (102) may include one or more user programs (110A-110N), a client protection agent (112), a client mounting agent (114), a client operating system (116), and a client storage array (124). Each of these client device (102) components is described below.

In one embodiment of the invention, a user program (110A-110N) may refer to a computer program that may execute on the underlying hardware of the client device (102). Specifically, a user program (110A-110N) may be designed and configured to perform one or more functions, tasks, and/or activities instantiated by a user of the client device (102). Accordingly, towards performing these operations, a user program (110A-110N) may include functionality to request and consume client device (102) resources (e.g., computer processors, memory, storage (124), virtualization, network bandwidth, etc.) by way of service calls to the client operating system (116). One of ordinary skill will appreciate that a user program (110A-110N) may perform other functionalities without departing from the scope of the invention. Examples of a user program (110A-110N) may include, but are not limited to, a word processor, an email client, a database client, a web browser, a media player, a file viewer, an image editor, a simulator, a computer game, or any other computer executable application.

In one embodiment of the invention, the client protection agent (112) may refer to a computer program that may execute on the underlying hardware of the client device (102). Specifically, the client protection agent (112) may be designed and configured to perform client-side database backup and recovery operations. To that extent, the client protection agent (112) may protect one or more databases (also referred herein as system assets (126) and/or user assets (128A-128N)) on the client device (102) against data loss (i.e., backup the database(s)); and reconstruct one or more databases on the client device (102) following such data loss (i.e., recover the database(s)). One of ordinary skill will appreciate that the client protection agent (112) may perform other functionalities without departing from the scope of the invention.

In one embodiment of the invention, the client mounting agent (114) may refer to a computer program that may execute on the underlying hardware of the client device (102). Specifically, the client mounting agent (114) may be designed and configured to perform client-side database mounting and unmounting operations. To that extent, the client mounting agent (114) may include functionality to perform one or more of the various steps outlined below with respect to FIGS. 2A-2D, which may be directed to facilitating the establishment of a backup database data live mount (or mount point) on the client device (102) in response to a user program (110A-110N) trigger event for a backup operation targeting a user asset (128A-128N) on the client device (102). As a result, the mounted backup storage system (106) database data may be accessed and/or manipulated by the client device (102) and components of the client device (102). One of ordinary skill will appreciate that the client mounting agent (114) may perform other functionalities without departing from the scope of the invention.

In one embodiment of the invention, the client operating system (116) may refer to a computer program that may execute on the underlying hardware of the client device (102). Specifically, the client operating system (116) may be designed and configured to oversee client device (102) operations. To that extent, the client operating system (116) may include functionality to, for example, support fundamental client device (102) functions; schedule tasks; mediate interactivity between logical (e.g., software) and physical (e.g., hardware) client device (102) components; allocate client device (102) resources; and execute or invoke other computer programs executing on the client device (102). One of ordinary skill will appreciate that the client operating system (116) may perform other functionalities without departing from the scope of the invention.

For example, the client operating system (116) may facilitate user program (110A-110N) interaction with user asset (128A-128N) data stored locally on the client device (102) or remotely over the network (104). In facilitating the aforementioned interaction, the client operating system (116) may implement a client logical file system (118). The client logical file system (118) may represent a collection of in-memory data structures maintained, by the client operating system (116), to manage the various accessible user asset (128A-128N) data stored locally on the client device (102) and/or remotely on the backup storage system (106). Further, the client logical file system (118) may expose an application programming interface (API) through which the user program(s) (110A-110N) may manipulate—i.e., via one or more file operations—any granularity of locally and/or remotely stored user asset (128A-128N) data. These file operations, requested by the user program(s) (110A-110N), may subsequently be delivered to the client file system (120) or backup file system interface (122) for processing.

In one embodiment of the invention, the client file system (120) may represent a physical file system (also referred to as a file system implementation). A physical file system may refer to a collection of subroutines concerned with the physical operation of one or more physical storage devices (described below). The client file system (120), in this respect, may be concerned with the physical operation of the client storage array (124). Accordingly, the client file system (120) may employ client storage array (124) device drivers (or firmware) (not shown) to process requested file operations from the user program(s) (110A-110N). Device drivers enable the client file system (120) to manipulate physical storage or disk blocks as appropriate.

In one embodiment of the invention, the backup file system interface (122) may represent a computer program that may execute on the underlying hardware of the client device (102). Specifically, the backup file system interface (122) may be designed and configured to facilitate the access and manipulation of remotely stored database data as if the aforementioned database data were stored locally on the client device (102). Accordingly, the backup file system interface (122) may, in part, implement a distributed file system (DFS), which may employ any known DFS protocol (e.g., the network file system (NFS) protocol). A DFS may refer to a mechanism through which files (e.g., database data) may be stored and accessed based on client-server architecture over a network (104). Particularly, in a DFS, one or more central appliances (e.g., the backup storage system (106)) store files that can be accessed, with proper authorization permissions, by any number of remote clients (e.g., the client device (102)) across the network (104). Furthermore, the backup file system interface (122) may include functionality to issue remote procedure calls (RPCs) directed to accessing and manipulating any granularity of database data remotely stored on the backup storage system (106). The invention is not limited to the aforementioned protocols.

In one embodiment of the invention, the client storage array (124) may refer to a collection of one or more physical storage devices (not shown) on which various forms of digital data—e.g., a system asset (126) and one or more user assets (128A-128N) (described below)—may be consolidated. Each physical storage device may encompass non-transitory computer readable storage media on which data may be stored in whole or in part, and temporarily or permanently. Further, each physical storage device may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the client storage array (124) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, a system asset (126) may represent a database, or a logical container to and from which related digital data, or any granularity thereof, may be stored and retrieved, respectively. A system asset (126) may occupy a portion of a physical storage device or, alternatively, may span across multiple physical storage devices, of the client storage array (124). Furthermore, a system asset (126) may refer to a composite of various database objects including, but not limited to, one or more recovery catalogs (not shown, discussed below).

In one embodiment of the invention, a recovery catalog may refer to a database object for storing backup operation metadata. The recovery catalog may include entries for one or more backup operations. The recovery catalog entries may include metadata that includes information regarding successfully backed-up backup data files for a backup operation. The metadata may include backup data file identifiers, associated user asset identifiers, backup data file storage locations, and/or other types of metadata without departing from the scope of the invention.

In one embodiment of the invention, an user asset (128A-128N) may represent a database, or a logical container to and from which related digital data, or any granularity thereof, may be stored and retrieved, respectively. An user asset (128A-128N) may occupy a portion of a physical storage device or, alternatively, may span across multiple physical storage devices, of the client storage array (124). Furthermore, an user asset (128A-128N) may refer to a composite of various database objects including, but not limited to, one or more data files, one or more control files, one or more archive log files, and one or more asset lock files (all not shown; all described below). Each of these user asset (128A-128N) subcomponents is described below.

In one embodiment of the invention, a data file may refer to a database object that stores database data. Database data may encompass computer readable content (e.g., images, text, video, audio, machine code, any other form of computer readable content, or a combination thereof), which may be generated, interpreted, and/or processed by any given user program (110A-110N). Further, a data file may store database data in (a) undeduplicated form or (b) deduplicated form. In brief, the latter form of database data may be produced through the application of data deduplication on the former form of the database data. That is, undeduplicated database data may entail computer readable content that may or may not include redundant information. In contrast, deduplicated database data may result from the elimination of any redundant information found throughout the undeduplicated computer readable content and, accordingly, may instead reflect a content recipe of the undeduplicated computer readable content. A content recipe may refer to a sequence of chunk identifiers (or pointers) associated with (or directed to) unique database data chunks consolidated in physical storage. Collectively, the sequence of chunk identifiers (or pointers)—representative of the deduplicated database data—may be used to reconstruct the corresponding undeduplicated database data. Moreover, a given chunk identifier for a given database data chunk may encompass a cryptographic fingerprint or hash of the given database data chunk.

In one embodiment of the invention, a control file may refer to a database object that stores user asset (128A-128N) metadata (also referred to as database metadata). Database metadata may encompass information descriptive of the database (or user asset (128A-128N)) status and structure. By way of examples, database metadata may include, but are not limited to, a database name assigned to the user asset (128A-128N), the name(s) and storage location(s) of one or more data files and archive log files associated with the user asset (128A-128N), a creation timestamp encoding the date and/or time marking the creation of the user asset (128A-128N), a log sequence number associated with a current archive log file, etc.

In one embodiment of the invention, an archive log file may refer to a database object that stores a history of changes made to the database data. An archive log file may include one or more redo entries (or redo records), which may include a set of change vectors. Each change vector subsequently describes or represents a modification made to a single user asset (128A-128N) data block. Furthermore, an archive log file may serve to recover the user asset (128A-128N) should a failover occur, or to apply recent changes to a recovered user asset (128A-128N) which may have transpired during the database recovery process.

In one embodiment of the invention, an asset lock file may refer to a data base object that stores metadata descriptive of byte-range locks for various operations. The metadata may include byte-ranges, statuses, and owners of the byte-range locks included in the asset lock file. The byte-ranges may specify a range of bytes associated with an operation. Moreover, a specific range of bytes in the asset lock file may be associated with the byte-range lock for incremental and full backup operations, archive log backup operations, control file backup operations, storage unmount operations, and storage mount operations. The statuses of the byte-range locks may indicate whether the locks are locked (i.e., unavailable for acquisition by current backup operation) or unlocked (i.e., available for acquisition by current backup operation). The owners may refer to backup operation identifiers that may be used to determine the backup operation that has locked a particular byte-range lock.

While FIG. 1B shows a configuration of components, other client device (102) configurations may be used without departing from the scope of the invention.

Figure 1C:
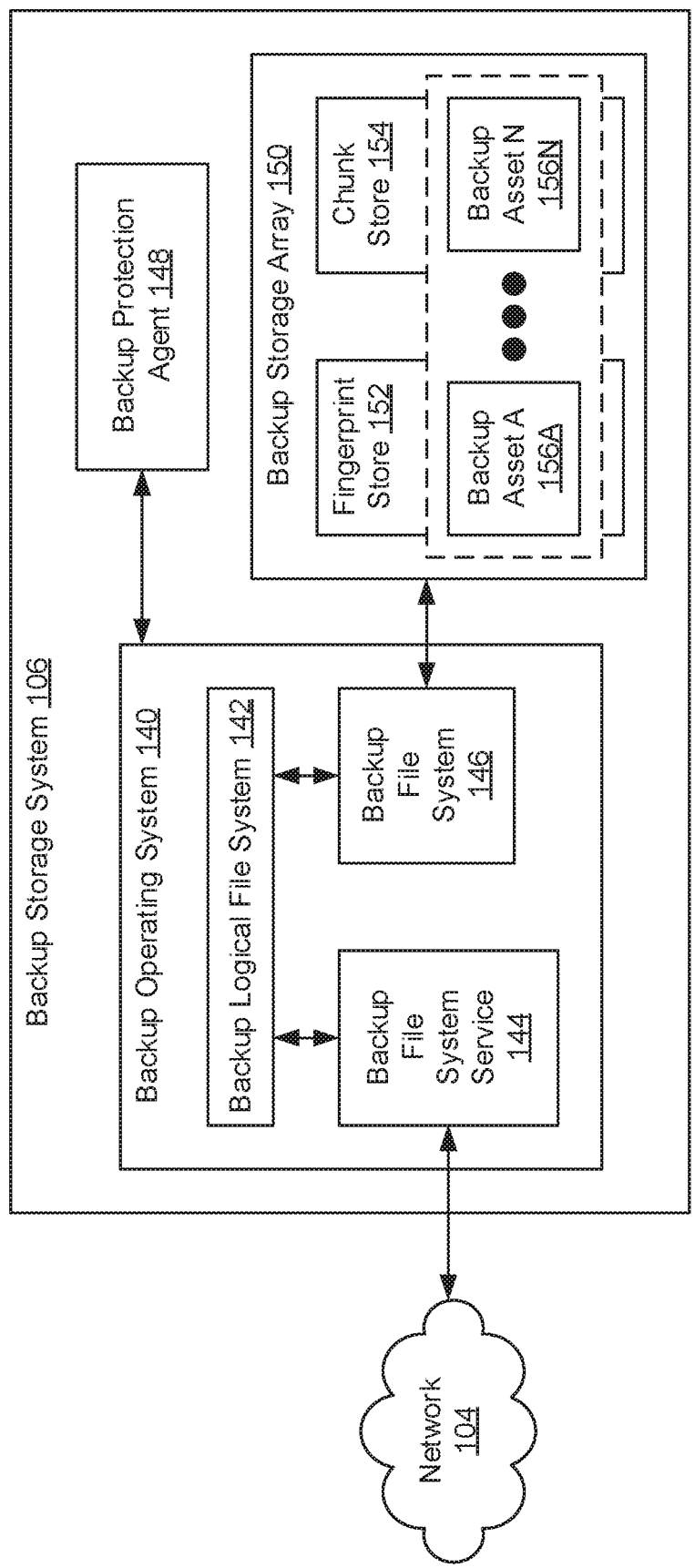
FIG. 1C shows a backup storage system in accordance with one or more embodiments of the invention.

FIG. 1C shows a backup storage system in accordance with one or more embodiments of the invention. The backup storage system (106) may include a backup operating system (140), a backup protection agent (148), and a backup storage array (150). Each of these backup storage system (106) components is described below.

In one embodiment of the invention, the backup operating system (140) may refer to a computer program that may execute on the underlying hardware of the backup storage system (106). Specifically, the backup operating system (140) may be designed and configured to oversee backup storage system (106) operations. To that extent, the backup operating system (140) may include functionality to, for example, support fundamental backup storage system (106) functions; schedule tasks; mediate interactivity between logical (e.g., software) and physical (e.g., hardware) backup storage system (106) components; allocate backup storage system (106) resources; and execute or invoke other computer programs executing on the backup storage system (106). One of ordinary skill will appreciate that the backup operating system (140) may perform other functionalities without departing from the scope of the invention.

For example, the backup operating system (140) may facilitate backup asset (156A-156N) access and manipulation by one or more computer programs (e.g., backup protection agent (148)) executing locally on the backup storage system (106) or, alternatively, by one or more remote computing systems (e.g., client device(s) (102A-102N)) over the network (104). In facilitating the aforementioned interaction, the backup operating system (140) may implement a backup logical file system (142). The backup logical file system (142) may represent a collection of in-memory data structures maintained, by the backup operating system (140), to manage the various accessible backup asset (156A-156N) data stored locally on the backup storage system (106). Further, the backup logical file system (142) may expose an application programming interface (API) through which the local computer programs and/or remote computing systems may manipulate—i.e., via one or more file operations—any granularity of locally stored backup asset (156A-156N) data. File operations, requested by the local computer programs, may be delivered to the backup file system (146) for processing, whereas file operations, requested by the remote computing systems, may be received and processed by the backup file system service (144).

In one embodiment of the invention, the backup file system service (144) may represent a computer program that may execute on the underlying hardware of the backup storage system (106). Specifically, the backup file system service (144) may be designed and configured to facilitate the authorized, remote access and manipulation of locally stored backup database data. Accordingly, the backup file system service (144) may, in part, implement a DFS, which may employ any known distributed file system protocol (e.g., NFS protocol). A DFS may refer to a mechanism through which files (e.g., database data) may be stored and accessed based on client-server architecture over a network (104). Particularly, in a DFS, one or more central appliances (e.g., the backup storage system (106)) store files that can be accessed, with proper authorization permissions, by any number of remote clients (e.g., the client device(s) (102A-102N)) across the network (104). Furthermore, the backup file system service (144) may include functionality to service RPCs directed to accessing and manipulating any granularity of backup database data locally stored on the backup storage system (106). The invention is not limited to the aforementioned protocols.

In one embodiment of the invention, the backup file system (146) may represent a physical file system (also referred to as a file system implementation). A physical file system may refer to a collection of subroutines concerned with the physical operation of one or more physical storage devices (described below). The backup file system (146), in this respect, may be concerned with the physical operation of the backup storage array (150). Accordingly, the backup file system (146) may employ backup storage array (150) device drivers (or firmware) (not shown) to process requested file operations from the local computer programs or the remote computing systems (via the backup file system service (144)). Device drivers enable the backup file system (146) to manipulate physical storage or disk blocks as appropriate.

In one embodiment of the invention, the backup protection agent (148) may refer to a computer program that may execute on the underlying hardware of the backup storage system (106). Specifically, the backup protection agent (148) may be designed and configured to perform server-side database backup and recovery operations. To that extent, the backup protection agent (148) may receive database data, submitted by the client device(s) (102A-102N), to store as backup assets (156A-156N) on the backup storage array (150) during database backup operations; and, conversely, may retrieve backup database data from the backup storage array (150) during database recovery operations. One of ordinary skill will appreciate that the backup protection agent (148) may perform other functionalities without departing from the scope of the invention.

In one embodiment of the invention, the backup storage array (150) may refer to a collection of one or more physical storage devices (not shown) on which various forms of digital data—e.g., one or more backup assets (156A-156N) (described below)—may be consolidated. Each physical storage device may encompass non-transitory computer readable storage media on which data may be stored in whole or in part, and temporarily or permanently. Further, each physical storage device may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the backup storage array (150) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the backup storage array (150) may include a fingerprint store (152) and a chunk store (154), which may collectively include deduplicated database data. Recall from above (see e.g., FIG. 1B), that deduplicated database data may result from the elimination of any redundant information found throughout the database data in undeduplicated form. Accordingly, instead of reflecting the binary composition of the undeduplicated database data in its entirety, deduplicated database data may alternatively reflect reduced information in the form of a content recipe of the representative, undeduplicated computer readable content. The aforementioned content recipe may refer to a sequence of chunk identifiers (or pointers) associated with (or directed to) unique database data chunks identified throughout the undeduplicated database data. Any unique database data chunks, along with their respective chunk identifiers (i.e., cryptographic fingerprints or hashes), may be indexed in appropriate physical storages—e.g., the chunk store (154) and the fingerprint store (152), respectively.

In one embodiment of the invention, the fingerprint store (152) may represent a repository for maintaining chunk identifiers. Each chunk identifier may be indexed by way of a fingerprint store (152) entry (not shown), which may store a mapping relating the chunk identifier to a storage identifier. A chunk identifier (also referred to as a fingerprint or hash) may represent a digital signature that uniquely identifies an associated database data chunk. Further, a chunk identifier may be produced by submitting the associated database data chunk through a hash function, which may employ any existing cryptographic mapping algorithm. As such, a chunk identifier may be outputted by the hash function given the associated database data chunk as input. Meanwhile, a storage identifier may represent a character or bit string that uniquely identifies a storage location in the backup storage array (150). By way of an example, a storage identifier may encompass a tuple reflecting (a) a storage device identifier uniquely assigned to a given physical storage device (not shown) of the backup storage array (150); and (b) a binary address assigned to a starting byte (or storage block) in the given physical storage device at which the database data chunk may be physically stored.

On the other hand, in one embodiment of the invention, the chunk store (154) may represent a repository for maintaining unique database data chunks. Each unique database data chunk may be indexed by way of a chunk store (154) entry (not shown), which may store a mapping relating a storage identifier (described above) to the unique database data chunk. A database data chunk may refer to a fragment or a partition of deduplicated database data. More specifically, a database data chunk may capture a unique byte pattern that may occur or recur throughout the undeduplicated database data.

In one embodiment of the invention, a backup asset (156A-156N) may refer to a deduplicated backup copy of a given user asset (128A-128N) (see e.g., FIG. 1B). For example, a backup asset (156A-156N) may represent a database, or a logical container to and from which related digital data, or any granularity thereof, may be stored and retrieved, respectively. A backup asset (156A-156N) may occupy a portion of a physical storage device or, alternatively, may span across multiple physical storage devices, of the backup storage array (150). Furthermore, a backup asset (156A-156N) may include a combination of various database objects including, but not limited to, one or more data files, one or more control files, and one or more archive log files, (all described above).

While FIG. 1C shows a configuration of components, other backup storage system (106) configurations may be used without departing from the scope of the invention.

FIGS. 2A-2D show flowcharts describing a method for cooperative parallel database backup operations in accordance with one or more embodiments of the invention. The various steps outlined below may be performed by the client protection agent (see e.g., FIG. 1B). Further, while the various steps in the flowcharts are presented and described sequentially, one of ordinary skill will appreciate that some or all steps may be executed in different orders, may be combined or omitted, and some or all steps may be executed in parallel.

In Step 200, a trigger event for a backup operation targeting a user asset is detected. In one embodiment of the invention, a backup operation trigger event may be an occurrence that when met, causes the initiation of a backup operation. A backup operation trigger event may be, for example, a scheduled job or an on-demand instruction, or any other event that triggers the backup operation without departing from the invention. A scheduled job may be a job that is a part of a backup operation schedule. A backup operation schedule may lay out specific points in time a backup operation is to be performed. For example, an incremental backup operation schedule may specify an incremental backup operation be performed twice a day at midnight and noon. An on-demand instruction may specify an instruction to perform an unscheduled backup operation.

In one embodiment of the invention, the trigger event may specify an user asset identifier, backup operation type associated with the backup operation, and backup storage mounting metadata. The trigger event may specify additional and/or different information without departing from the invention. The user asset identifier may be used to identify the user asset for which the backup operation is targeting. The backup operation type may be used to specify whether the backup operation is a full backup operation, incremental backup operation, archive log backup operation, or a control file backup operation. The backup storage mounting metadata may include a mount point or a pathname of a directory on which the backup storage is to be mounted on the client device, a backup storage hostname, and a storage device pathname.

In Step 202, a determination is made as to whether the backup operation is the first full backup operation. Accordingly, in one embodiment of the invention, if it is determined that this is the first full backup operation for the particular user asset (e.g., the user asset specified in the trigger event), then the method proceeds to Step 204; otherwise, the method proceeds to Step 206.

In Step 204, an asset lock file for the user asset is created based on the user asset identifier. In one embodiment of the invention, the asset lock file may include one or more metadata descriptive of byte-range locks for various operations as discussed above. The metadata may include byte-ranges, statuses, and owners (described above) (e.g., see FIG. 1B). The various operations may include, but are not limited to, full backup operations, incremental backup operations, archive log backup operations, control file backup operations, storage unmount operations, and storage mount operations.

In Step 206, an attempt is made to acquire, using the asset lock file, a byte-range lock associated with the backup operation. In one embodiment of invention, the a backup operation may acquire the byte-range lock associated with the backup operation (full, incremental, archive log, control file, etc.) to confirm that the backup operation may proceed. If the byte-range is unavailable, a previous backup operation of the same type or a storage unmounting operation may be in progress. Moreover, if the byte-range lock is unavailable, the backup operation may not be allowed to be performed at the point in time the attempt to acquire the byte-range lock associated with the backup operation type was made. For more information regarding attempting to acquire the byte-range lock associated with the backup operation type, see e.g., FIG. 4.

In Step 208, a determination is made as to whether the attempt to acquire the byte-range lock associated with the backup operation type was successful. The determination in Step 208 may be based on the result of performing the method in FIG. 4. Accordingly, in one embodiment of the invention, if it is determined that the attempt to acquire the byte-range lock associated with the backup operation was successful, then the method proceeds to Step 210; otherwise, the method proceeds to Step 260 of FIG. 2C.

Figure 2A:
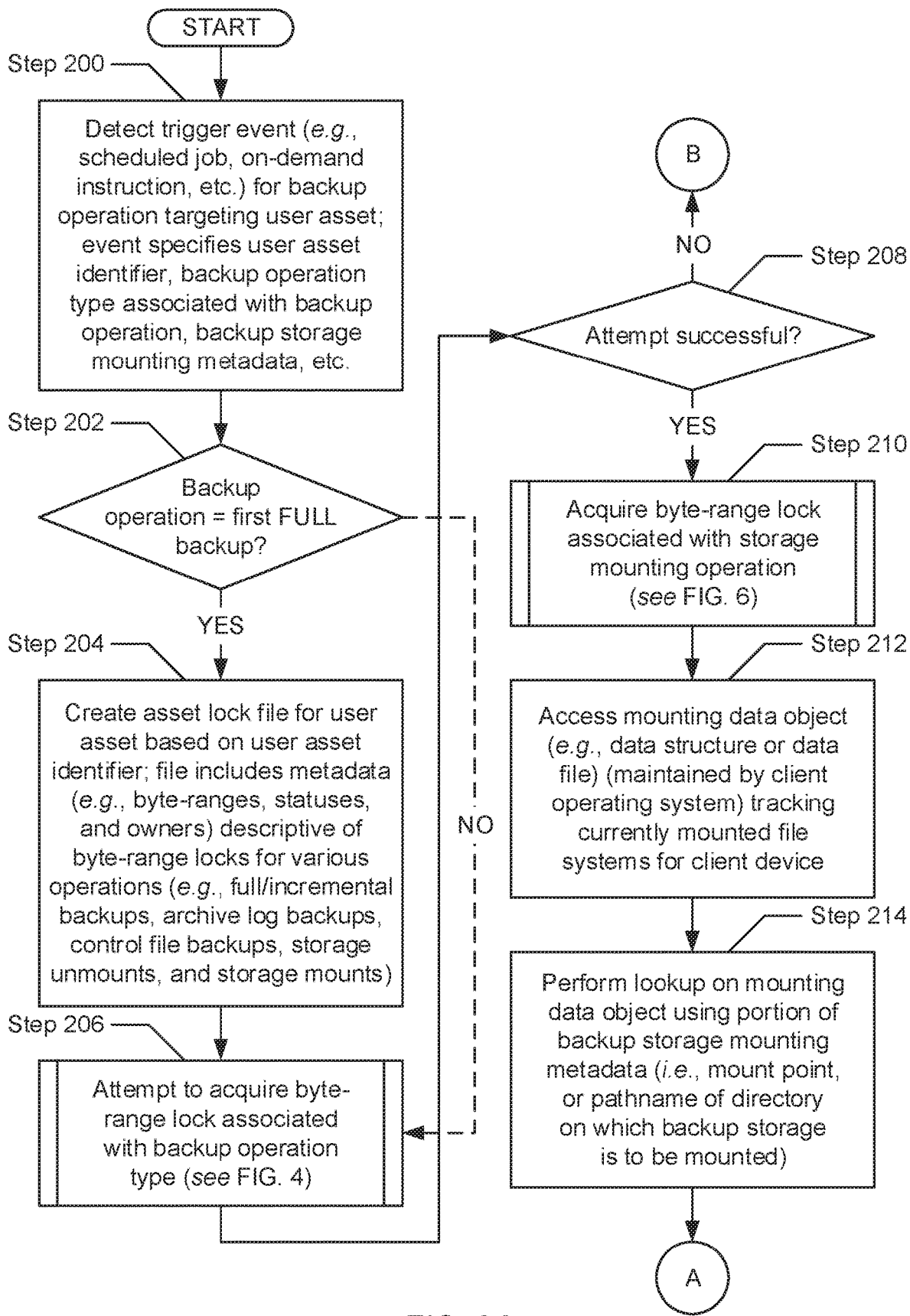
FIGS. 2A-2D show flowcharts describing a method for cooperative parallel database backup operations in accordance with one or more embodiments of the invention.

Continuing with the discussion of FIG. 2A, in Step 210, in response to the determination in Step 208 that the attempt to acquire the byte-range lock associated with the backup operation type was successful, an attempt is made to acquire, using the asset lock file, the byte-range lock associated with the storage mounting operation. In one embodiment of the invention, the byte-range lock may be acquired to prevent another storage mounting operation from interrupting the current backup operation. For additional details regarding acquiring the byte-range lock associated with the storage mounting operation, see e.g., FIG. 6.

In Step 212, after the byte-range lock associated with the storage mounting operation is acquired in Step 210, a mounting data object tracking currently mounted file systems for the client device is accessed. In one embodiment of the invention, the mounting data object may be a data structure or data file maintained by the client operating system. The mounting data object may include an entry that reflects information regarding a currently mounted backup storage. The information may include a mount point, and/or a pathname of a directory on which a backup storage is mounted, a backup storage hostname, and a storage device pathname.

In Step 214, a lookup is performed on the mounting data object using a portion of the backup storage mounting metadata. The backup storage mounting metadata may be the backup storage mounting metadata obtained from the trigger event in Step 200. The backup storage mounting metadata may include a mount point or a pathname of a directory on which the backup storage is to be mounted. The lookup may be performed to determine whether a backup storage is currently mounted on the client device. The method then proceeds to step 220 in FIG. 2B.

Figure 2B:
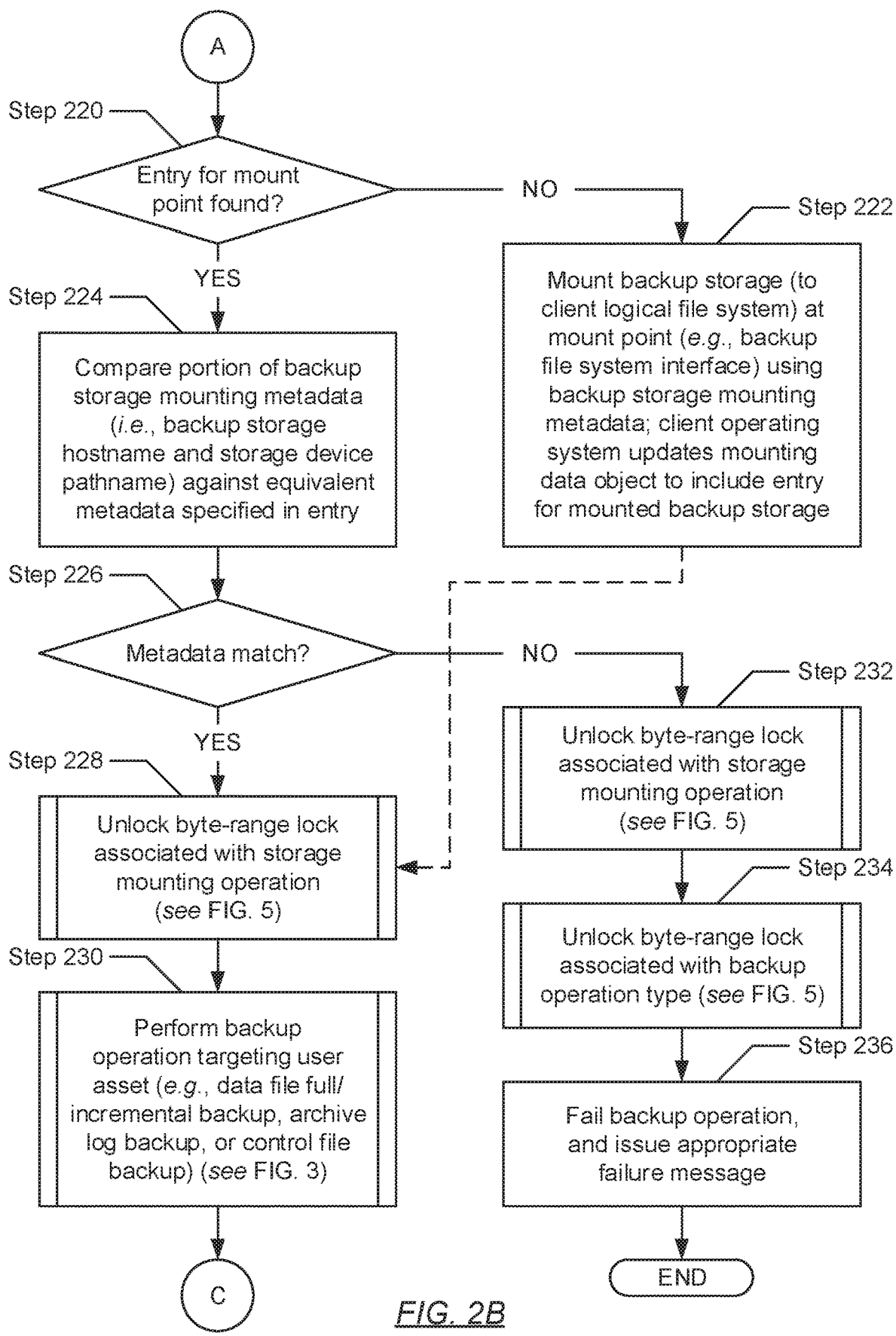

Turning to FIG. 2B, in Step 220, a determination is made as to whether an entry for a mount point was found in the mounting data object. Accordingly, in one embodiment of the invention, if it is determined that an entry for a mount point was found in the mounting data object, then the method proceeds to Step 224; otherwise, the method proceeds to Step 222.

In Step 222, in response to the determination in Step 220 that no entry for a mount point was found in the mounting data object, the backup storage is mounted at the mount point using the backup storage mounting metadata. The backup storage mounting metadata used to mount the backup storage may include a mount point and/or pathname of a directory on which the backup storage is to be mounted. In one embodiment of the invention, the client operating system may update the mounting data object to include an entry for the newly mounted backup storage to indicate the backup storage is currently mounted on the client device. The process then proceeds to Step 228.

In Step 224, in response to the determination in Step 220 that an entry for a mount point was found, a portion of the backup storage mounting metadata is compared against equivalent metadata specified in the entry that was found on the mounting data object. The backup storage mounting metadata may include a backup storage hostname and a storage device pathname. The backup storage mounting metadata may be compared with equivalent metadata included in the entry to determine if the client logical file system has already mounted the backup storage using the backup storage hostname and the storage device pathname.

In Step 226, a determination is made as to whether the metadata match. Accordingly, in one embodiment of the invention, if it is determined that the metadata do not match (i.e., the client logical file system has not mounted the backup storage as defined by the backup storage mounting metadata), then the method proceeds to Step 232; otherwise, the method proceeds to Step 228.

In Step 228, in response to the determination in Step 226 that the desired backup storage is mounted to the client device or the backup storage was mounted on the client device in Step 222, the byte-range lock associated with the storage mounting operation is unlocked. The backup storage mounting operation may be over and to allow for future backup storage mounting operations, the byte-range lock associated with the backup storage mounting operation may be unlocked. For additional information regarding unlocking the byte-lock range associated with the storage mounting operation, see e.g., FIG. 5.

In Step 230, the backup operation targeting the user asset (e.g., the user assert defined in the trigger event) is performed. In one embodiment of the invention, the backup operation may be a data file full backup operation, a data file incremental backup operation, an archive log backup operation, or a control file backup operation. For more information regarding the performance of a backup operation targeting the user asset, see e.g., FIG. 3.

In Step 232, in response to the determination in Step 226 that the metadata in the entry on the mount data object does not match the backup storage mounting metadata, the byte-range lock associated with the storage mounting operation is unlocked. The current backup storage mounted on the client may not be the desired backup storage for the current backup operation and the backup operation may not continue. Before failing the backup operation, the locks on the asset lock file obtained during the operation may be unlocked for subsequent backup operations. Accordingly, the byte-range associated with the storage mounting operation may be unlocked. For additional information regarding unlocking the byte-range lock associated with the storage mounting operation, see e.g., FIG. 5.

In Step 234, the byte-range lock associated with backup operation type is unlocked. As discussed above, before failing the backup operation, the locks on the asset lock file obtained during the operation may be unlocked for subsequent backup operations. Accordingly, the byte-range lock associated with the backup operation type may be unlocked. For additional information regarding unlocking the byte-range lock associated with the backup operation type, see e.g., FIG. 5.

In Step 236, the backup operation is failed. In one embodiment of the invention, an appropriate failure message may be issued. The backup operation may be failed to prevent the performance of an unauthorized backup operation that may not be allowed at this point in time. The failure message may indicate that the backup storage currently mounted on the client device is not the desired backup storage for the current backup operation.

Figure 2C:
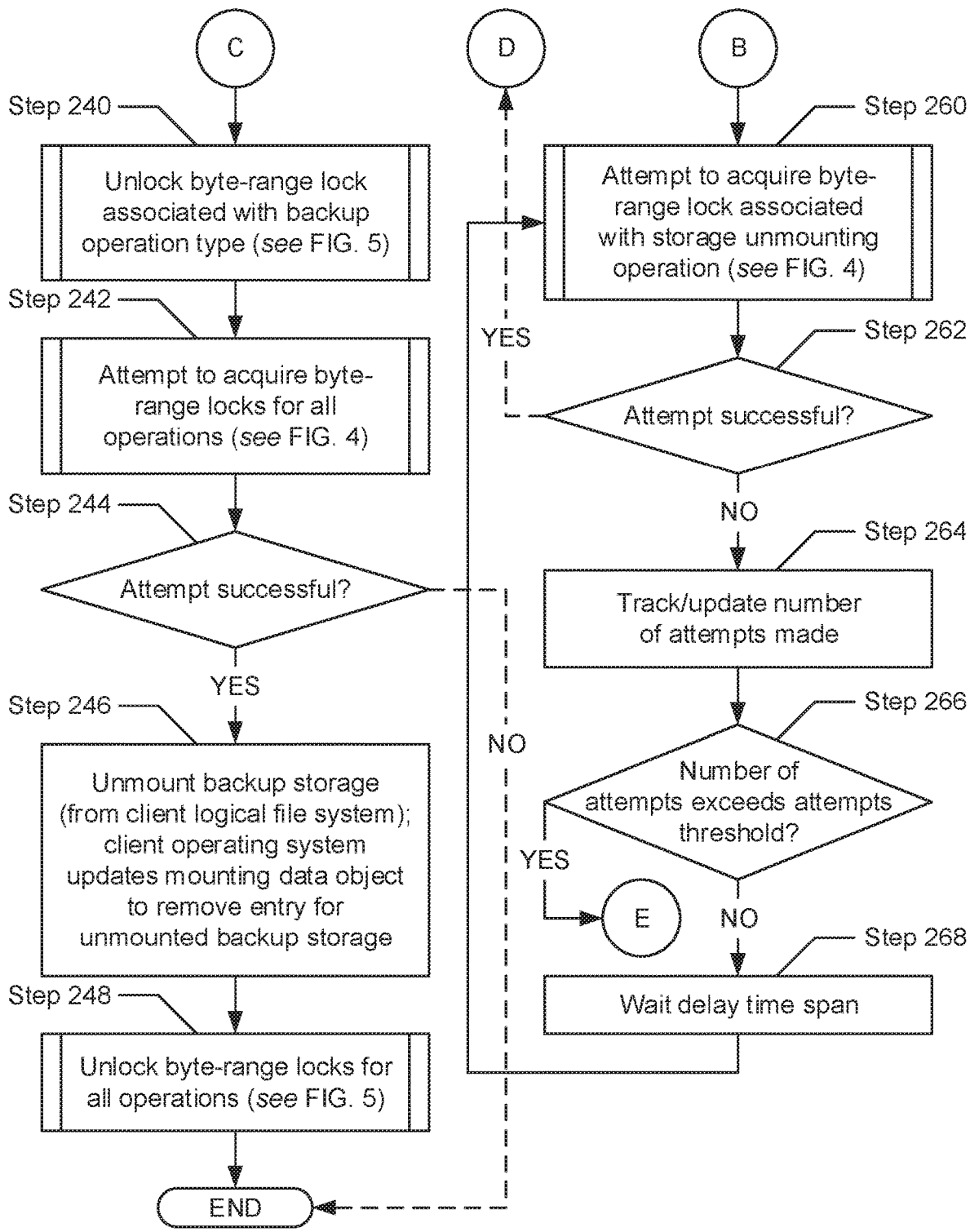

Turning to FIG. 2C, following Step 230, in Step 240, the byte-range lock associated with the backup operation type is unlocked. In one embodiment of the invention, after the completion of the backup operation, the byte-range lock associated with the backup operation type may be unlocked to allow the performance of subsequent backup operations of the same type and to continue with either unmounting the backup storage or other backup operations. For additional information regarding unlocking the byte-range lock associated with the backup operation type, see e.g., FIG. 5.

In Step 242, an attempt to acquire all of the byte-range locks associated the user asset and specified in the asset lock file. In one embodiment of the invention, the attempt to acquire the byte-range locks for all operations (including a storage unmounting lock) may determine whether there are other backup operations for the user asset currently in progress and whether performing a backup storage unmounting operation may interrupt the other in-progress backup operations. If all of the byte-range locks are acquired, then no other backup operations for the user asset may be in progress. On the other hand, if all of the byte-range locks are not acquired, then other backup operations for the user asset may be in progress. For additional information regarding attempting to acquire the byte-range locks for all operations, see FIG. 4.

In Step 244, a determination is made as to whether the attempt to acquire the byte-range locks for all operations was successful. Accordingly, in one embodiment of the invention, if it is determined that the attempt to acquire the byte-range locks for all operations was successful, then the method proceeds to Step 246; otherwise, the process proceeds to Step 244.

In Step 246, in response to the determination in Step 244 that the attempt to acquire all of the byte-range locks for all operations was successful, the backup storage is unmounted from the client logical file system. In one embodiment of the invention, unmounting the backup storage from the client logical file system may result in the backup storage becoming unavailable to the client device and allowing another backup storage to mount on the client device. The client operating system may update the mounting data object to remove the entry for the unmounted backup storage.

In Step 248, the byte-range locks for all operations are unlocked. In one embodiment of the invention, the byte-range locks for all operations may be unlocked to allow for subsequent backup operations. For additional information regarding unlocking the byte-range locks for all operations, see FIG. 5.

The method may end following Step 248.

In Step 260, in response to the determination in Step 208 that the attempt to obtain the byte-range lock associated with the backup operation type was not successful, an attempt is made to acquire the byte-range lock associated with a storage unmounting operation. In one embodiment of the invention, an unmount operation may be in progress, which includes acquiring byte-range locks for all backup operations and may be the reason the attempt to acquire the byte-range lock associated with the backup operation type was unsuccessful. If the attempt to acquire the byte-range lock associated with the storage unmounting operation is successful, then another backup operation of the same type may be in progress and have locked the byte-range lock associated with the backup operation type. If the attempt to acquire the byte-range lock associated with the storage unmounting operation is not successful, then a storage unmounting operation may be in progress and the current backup operation may wait until the storage unmounting operation is completed.

In Step 262, a determination is made as to whether the attempt to acquire the byte-range lock associated with the storage unmounting operation was successful. Accordingly, in one embodiment of the invention, if it is determined that the attempt to acquire the byte-range lock associated with the storage unmounting operation was successful, then the method proceeds to Step 280 of FIG. 2D. On the other hand, in another embodiment of the invention, if it is alternatively determined that the attempt to acquire the byte-range lock associated with the storage unmounting operation was not successful, then the method proceeds to Step 264.

In Step 264, the number of attempts made is tracked and updated. In one embodiment of the invention, the client protection agent may maintain and update an attempt-tracking data object that tracks the number of attempts made to acquire the byte-range lock associated with the storage unmounting operation. The attempt-tracking data object may be a data structure or a data file. The attempt-tracking data object may also include an attempts threshold and a delay time span. The attempts threshold may refer to the maximum number of allowed attempts to acquire the byte-range lock associated with the storage unmounting operation. The delay time span may refer to the time the backup operation waits before again attempting to acquire the byte-range lock associated with the storage unmounting operation (e.g., see Step 268).

In Step 266, a determination is made as to whether the number of attempts made to acquire the byte-range lock associated with the storage unmounting operation exceeds the attempts threshold. Accordingly, in one embodiment of the invention, if it is determined that the number of attempts to acquire the byte-range lock associated with the storage unmounting operation exceeds the attempts threshold, then the method proceeds to Step 282 of FIG. 2D. On the other hand, in another embodiment of the invention, if it is alternatively determined that the number of attempts to acquire the byte-range lock associated with the storage unmounting operation does not exceed the attempts threshold, then the method proceeds to Step 268.

In Step 268, the client protection agent that is performing the backup operation waits the delay time span. In one embodiment of the invention, the delay time span may be used to allow the storage unmounting operation to finish before reattempting to acquire the byte-range lock associated with the storage unmounting operation as discussed above. After the client protection agent that is performing the backup operation waits the delay time span, another attempt to acquire the byte-range lock associated with the storage unmount operation may be made via Step 260.

Figure 2D:
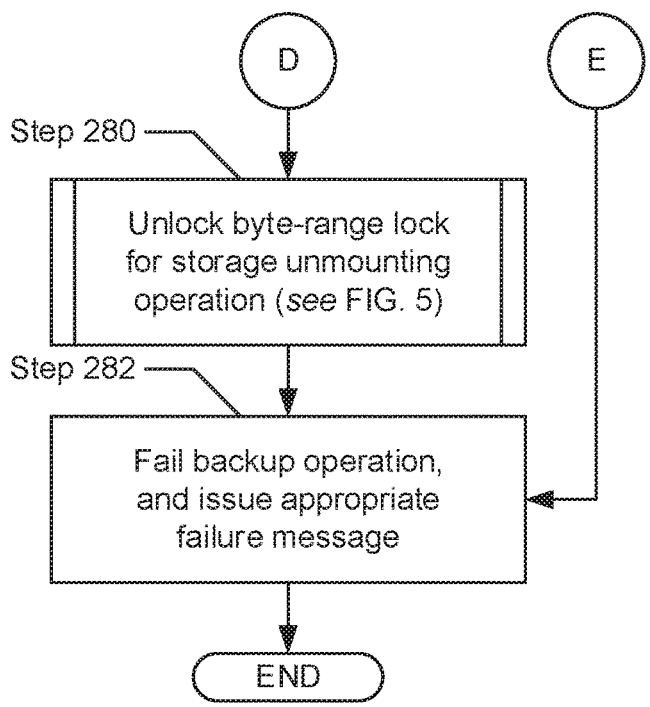

Turning to FIG. 2D, in Step 280, in response to the determination in Step 262 that the attempt to acquire the byte-range lock associated with the storage unmounting operation was successful, the byte-range lock associated with the storage unmounting operation is unlocked. The successful acquisition of the byte-range lock associated with the storage unmounting operation may indicate that no other storage unmounting operation is currently in progress, and that the byte-range lock may not be available for acquisition due to a backup operation of the same type currently in progress.

In Step 282, the backup operation is failed and the appropriate failure message is issued. In one embodiment of the invention, the backup operation may be failed to prevent the performance of an unauthorized backup operation that may not be allowed at this point in time. The failure message may indicate either a previous backup operation of the same type may currently be in progress or that the maximum number of attempts to acquire the byte-range lock associated with the storage unmounting operation has been reached indicating that another backup storage unmounting operation may currently be in progress.

The method may end following Step 282.

Figure 3:
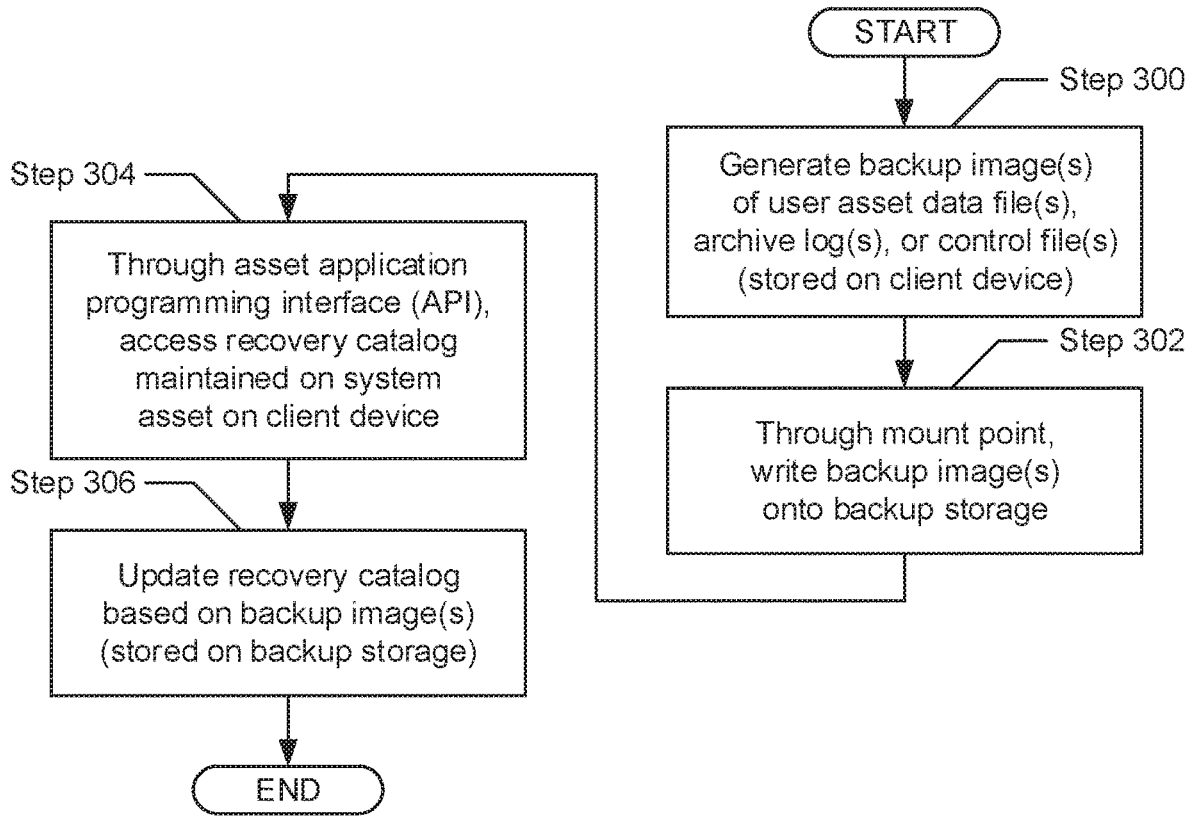
FIG. 3 shows a flowchart describing a method for performing a backup operation in accordance with one or more embodiments of the invention.

FIG. 3 shows a flowchart describing a method for performing a backup operation in accordance with one or more embodiments of the invention. The various steps outlined below may be performed by the client protection agent (see e.g., FIG. 1B). Further, while the various steps in the flowcharts are presented and described sequentially, one of ordinary skill will appreciate that some or all steps may be executed in different orders, may be combined or omitted, and some or all steps may be executed in parallel.

In Step 300, the backup image(s) of user asset data file(s), archive log(s), or control file(s) stored on a client device is/are generated. The backup operation may be a full backup operation, an incremental backup operation, archive log backup operation, or a control file backup operation as discussed above. Further, the backup image(s) may be generated in deduplicated form and, thus, may include an backup image content recipe. A content recipe may refer to a sequence of chunk identifiers (or pointers) associated with (or directed to) unique database data chunks indexed in physical storage—e.g., the chunk store of the backup storage array (see e.g., FIG. 1C). In turn, a given chunk identifier for a given database data chunk may encompass a cryptographic fingerprint or hash of the given database data chunk. Accordingly, in one embodiment of the invention, the backup content recipe may convey a sequence of fingerprints collectively representative of the undeduplicated backup image content.

In Step 302, the backup image(s) is/are written onto a backup storage through a mount point. In one embodiment of the invention, the backup image(s) may be written onto the mounted backup storage in the client logical file system through the backup file system interface over the network as discussed above.

In Step 304, a recovery catalog maintained on the client device is accessed through an asset application programming interface (API). The asset API may enable the client device and/or client device components to access and modify data files on the system asset of the client device as discussed above. Furthermore, the recovery catalog may include metadata regarding backup operations and associated backup image(s) stored in the backup storage system as discussed above.

In Step 306, the recovery catalog is updated based on the backup image(s) stored on the backup storage. Updating the recovery catalog may entail informing the client device of the existence of the new backup image(s) generated and stored in the backup storage system during the backup operation. In one embodiment of the invention, the recovery catalog may be updated to include metadata regarding the backup operation and the new backup image(s) included therein. The metadata included in the recovery catalog may be, for example, timestamps encoding dates and/or times during which the new backup image(s) had been generated and/or stored onto the backup storage, backup identifiers or names associated with the new backup image(s), a directory path in the backup file system at which the new backup image(s) may be found, etc.

The method may end following Step 306.

Figure 4:
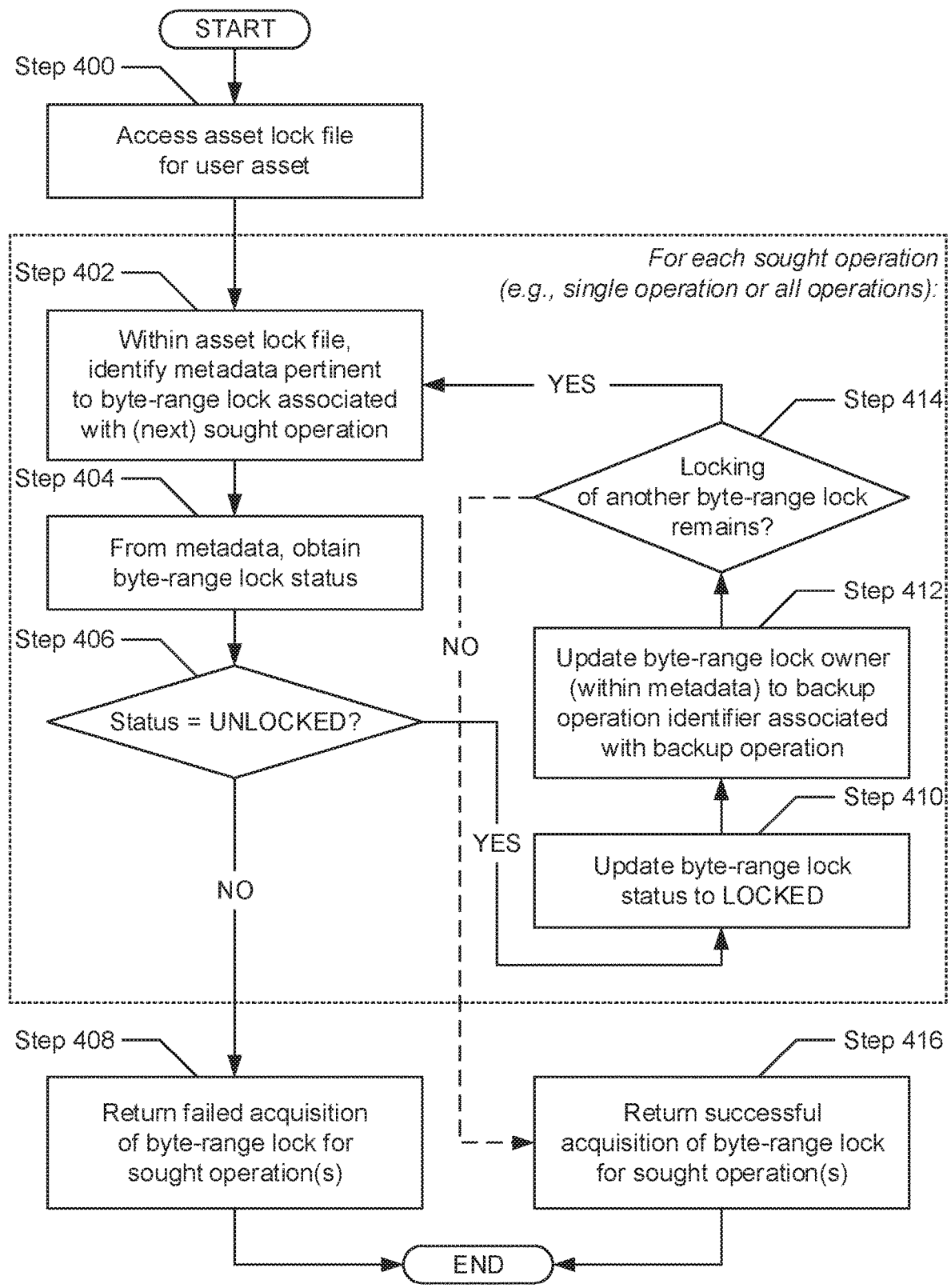
FIG. 4 shows a flowchart describing a method for attempting an acquisition of a byte-range lock for one or more backup operations in accordance with one or more embodiments of the invention.

FIG. 4 shows a flowchart describing a method for attempting an acquisition of a byte-range lock for one or more backup operations in accordance with one or more embodiments of the invention. The various steps outlined below may be performed by the client protection agent (see e.g., FIG. 1B). Further, while the various steps in the flowcharts are presented and described sequentially, one of ordinary skill will appreciate that some or all steps may be executed in different orders, may be combined or omitted, and some or all steps may be executed in parallel.

In Step 400, an asset lock file for a user asset is accessed. As discussed above, the asset lock file may include metadata descriptive of byte-range locks associated with various operations. The metadata may include byte-ranges, statuses, and owners. The various operations may include full backup operations, incremental backup operations, archive log backup operations, control file backup operations, storage unmount operations, and storage mount operations.

In Step 402, metadata pertinent to a byte-range lock associated with the next sought operation is identified within the asset lock file. In one embodiment of the invention, the asset lock file may include identifiers that categorize the metadata included in the asset lock file based on which operation the metadata is associated with. The identifiers may be used to identify the metadata pertinent to the next sought backup operation.

In Step 404, the byte-range lock status is obtained from the metadata. In one embodiment of the invention, the identified metadata may include the byte-range lock status associated with the next sought operation. The byte-range lock status may inform the client protection agent whether the byte-range lock associated with the next sought operation for the user asset is locked or unlocked. The unlocked status may indicate that no other operation of the same type is currently in progress and the lock may be available for the next sought operation. The locked status may indicate that another operation of the same type is currently in progress or an unmounting operation may be in progress and the byte-range lock may not be available for the next sought operation.

In Step 406, a determination is made as to whether the byte-range lock status is unlocked. Accordingly, in one embodiment of the invention, if it is determined that the byte-range lock is unlocked, then the method proceeds to Step 410. On the other hand, in another embodiment of the invention, if it is alternatively determined that the byte-range lock status is not unlocked, then the method proceeds to Step 408.

In Step 408, in response to the determination of Step 406 that the status of the byte-range lock associated with the sought operation was not unlocked (i.e., locked), failed acquisition of byte-range lock for sought operation(s) is returned. The failure return may notify the client protection agent performing the backup operation that the attempt to acquire the byte-range lock(s) for the desired operation was not successful.

In Step 410, the byte-range lock status is updated to locked. The byte-range lock status may be updated to reflect the byte-range lock associated with the sought operation is now owned by the backup operation. While the byte-range lock status is locked, no other operation may acquire the byte-range lock until it is unlocked by the operation that owns it. Locking byte-range locks may prevent the performance of conflicting backup operations on the user asset.

In Step 412, the byte-range lock owner is updated with the metadata to the operation identifier associated with the backup operation. In one embodiment of the invention, the updated owner information may be used to identify the backup operation that owns the byte-range lock. The owner information may be used when unlocking the byte-range lock (e.g., see FIG. 5).

In Step 414, a determination is made as to whether locking of another byte-range lock s required per the asset lock file in order to perform the next sought operation. Accordingly, in one embodiment of the invention, if it is determined that the locking of another byte-range lock remains, then the method proceeds to Step 402. On the other hand, in another embodiment of the invention, if it is alternatively determined that the locking of another byte-range lock does not remain, then the method proceeds to Step 416.

In Step 416, in response to the determination in Step 414 that the locking of another byte-range lock does not remain, successful acquisition of the byte-range lock(s) for the sought operation(s) is returned. The success return may notify the client protection agent performing the backup operation that the attempt to acquire the byte-range lock(s) for the desired operation was successful.

The method may end following Step 416.

Figure 5:
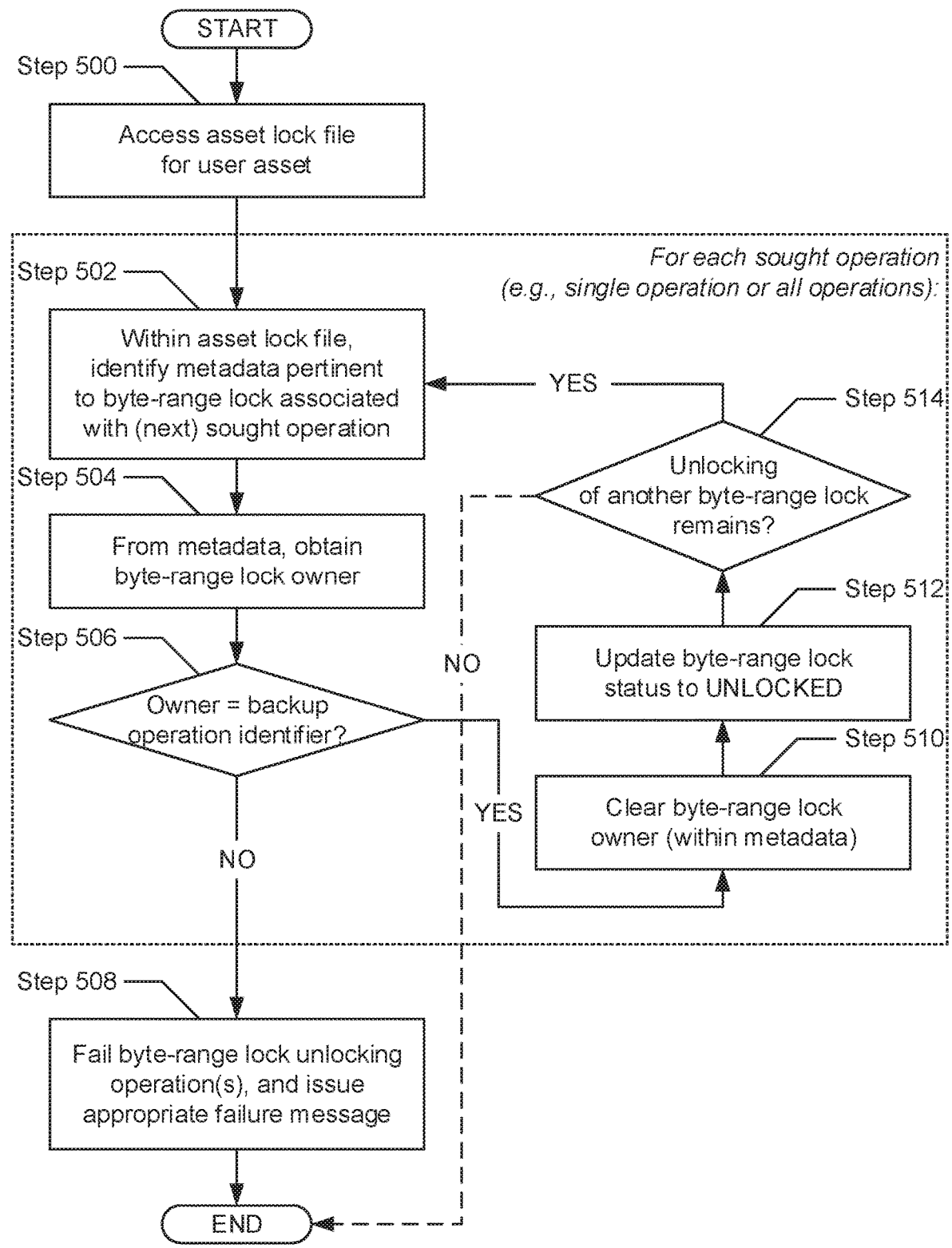
FIG. 5 shows a flowchart describing a method for unlocking a byte-range lock for one or more backup operations in accordance with one or more embodiments of the invention.

FIG. 5 shows a flowchart describing a method for unlocking a byte-range lock for one or more backup operations in accordance with one or more embodiments of the invention. The various steps outlined below may be performed by the client protection agent (see e.g., FIG. 1B). Further, while the various steps in the flowcharts are presented and described sequentially, one of ordinary skill will appreciate that some or all steps may be executed in different orders, may be combined or omitted, and some or all steps may be executed in parallel.

In Step 500, the asset lock file for a user asset is accessed. As discussed above, the asset lock file may include metadata descriptive of byte-range locks associated with various operations. The metadata may include byte-ranges, statuses, and owners. The various operations may include full backup operations, incremental backup operations, archive log backup operations, control file backup operations, storage unmount operations, and storage mount operations.

In Step 502, metadata pertinent to the byte-range lock associated with the sought (or next sought) operation is identified within the asset lock file. In one embodiment of the invention, the asset lock file may include identifiers which categorize the metadata included in the asset lock file based on which operation the metadata is associated with. The identifiers may be used to identify the metadata pertinent to the next sought backup operation.

In Step 504, the byte-range lock owner is obtained from the metadata. In one embodiment of the invention, the updated owner information may be used to identify the backup operation that owns the byte-range lock. The byte-range lock owner may be used to compare with the current backup operation identifier to determine whether the current backup operation may unlock the byte-range lock.

In Step 506, a determination is made as to whether the owner matches the backup operation identifier. Accordingly, in one embodiment of the invention, if it is determined that the owner matches the backup operation identifier, then the method proceeds to Step 510. On the other hand, in another embodiment of the invention, if it is alternatively determined that the owner does not match the backup operation identifier, then the method proceeds to Step 508.

In Step 508, in response to the determination in Step 506 that the owner does not match the backup operation identifier, the byte-range lock unlocking operation(s) is/are failed, and an appropriate failure message is issued. In one embodiment of the invention, the owner of the byte-range lock may be a different backup operation than the current backup operation. To avoid corrupting the backup operation that owns the byte-range lock, the byte-range unlock operation may be failed and a message may be issued indicating that another backup operation owns the byte-range lock.

In Step 510, in response to the determination in Step 506 that the owner of the byte-range lock does match the backup operation identifier, the byte-range lock owner is cleared within the metadata. As a result, the metadata in the asset lock file may indicate that the byte-range lock is not owned by a backup operation.

In Step 512, the byte-range lock status is updated to unlocked. In one embodiment of the invention, the byte-range lock status may be unlocked to allow future backup operations to acquire the byte-range lock.

In Step 514, a determination is made as to whether unlocking of another byte-range lock remains. Accordingly, in one embodiment of the invention, if it is determined that unlocking of another byte-range lock remains, then the method proceeds to Step 502. On the other hand, in another embodiment of the invention, if it is alternatively determined that unlocking of another byte-range lock does not remain, then the method may end following Step 514.

Figure 6:
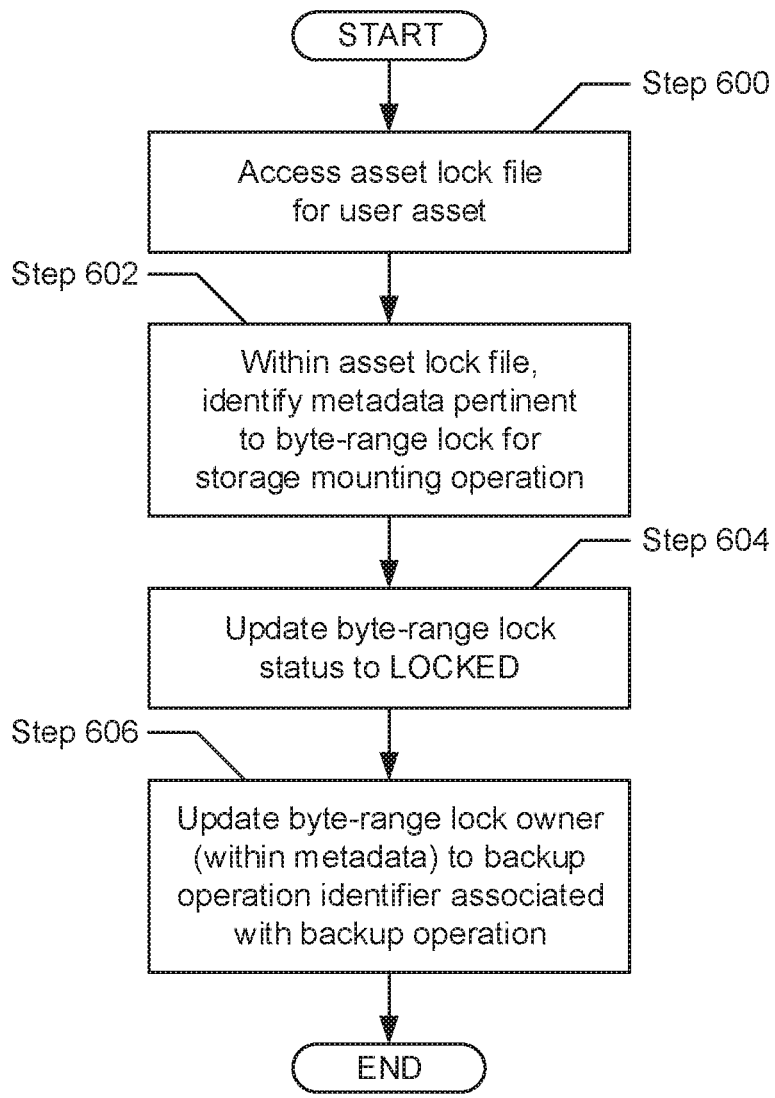
FIG. 6 shows a flowchart describing a method for acquiring a byte-range lock for a storage mounting operation in accordance with one or more embodiments of the invention.

FIG. 6 shows a flowchart describing a method for acquiring a byte-range lock for a storage mounting operation in accordance with one or more embodiments of the invention. The various steps outlined below may be performed by the client protection agent (see e.g., FIG. 1B). Further, while the various steps in the flowcharts are presented and described sequentially, one of ordinary skill will appreciate that some or all steps may be executed in different orders, may be combined or omitted, and some or all steps may be executed in parallel.

In Step 600, an asset lock file is accessed for an user asset. As discussed above, the asset lock file may include metadata descriptive of byte-range locks associated with various operations. The metadata may include byte-ranges, statuses, and owners. The various operations may include full backup operations, incremental backup operations, archive log backup operations, control file backup operations, storage unmount operations, and storage mount operations.

In Step 602, metadata pertinent to the byte-range lock for a storage mounting operation is identified within the asset lock file. In one embodiment of the invention, the asset lock file may include identifiers which categorize the metadata included in the asset lock file based on which operation the metadata is associated with. The identifiers may be used to identify the metadata pertinent to the next sought backup operation.

In Step 604, the byte-range lock status is updated to locked. The byte-range lock status may be updated to reflect the byte-range lock associated with the storage mounting operation owned by the backup operation. Therefore, the byte-range lock status may be updated to locked. While the byte-range lock status is locked, no other backup operation may acquire the byte-range lock for a storage mounting operation, therefore, no other backup storage may be mounted on the client device until the backup operation unlocks the byte-range lock for the mounting operation.

In Step 606, the byte-range lock owner is updated within the metadata to the backup operation identifier associated with the backup operation. In one embodiment of the invention, the updated owner information may be used to identify the backup operation that owns the byte-range lock. The owner information may be used when unlocking the byte-range lock (e.g., see FIG. 5).

The method may end following Step 606.

Figure 7:
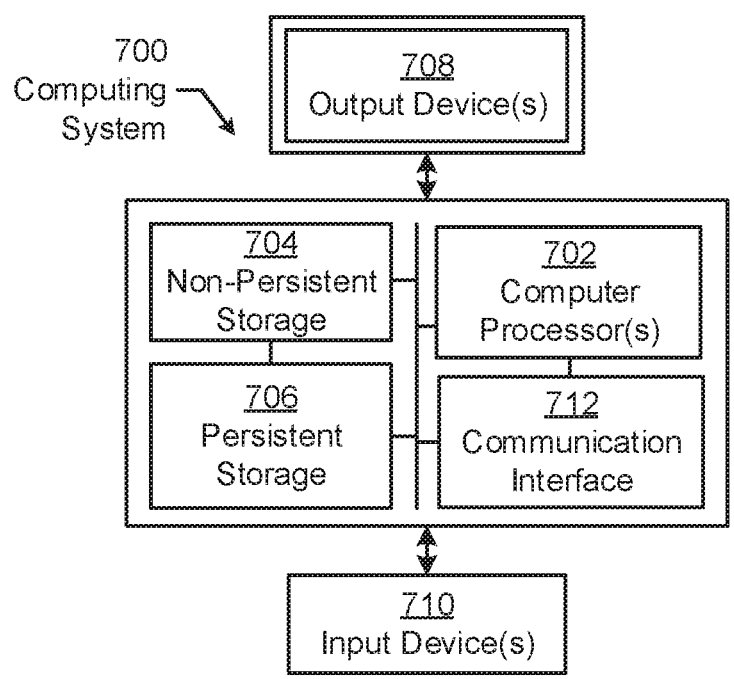
FIG. 7 shows an exemplary computing system in accordance with one or more embodiments of the invention.

FIG. 7 shows an exemplary computing system in accordance with one or more embodiments of the invention. The computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a central processing unit (CPU) and/or a graphics processing unit (GPU). The computing system (700) may also include one or more input devices (710), such as a touchscreen, keyboard, mouse, microphone, touchpad, electronic pen, or any other type of input device. Further, the communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

In one embodiment of the invention, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing operations, the method comprising:
    detecting a first trigger event for a first backup operation targeting a user asset of a client device of client devices, wherein the first trigger event specifies first metadata associated with the first backup operation;
    acquiring a first byte-range lock associated with a backup type specified in the first metadata in an asset lock file associated with the user asset;
    acquiring a second byte-range lock of the asset lock file that is associated with a storage mounting operation;
    after acquiring the first byte-range lock and the second byte-range lock, mounting a backup storage to the client device using the first metadata;
    unlocking the second byte-range lock; and
    performing, after unlocking the second byte-range lock, the first backup operation on the user asset.

2. The method of claim 1, further comprising:
    detecting a second trigger event for a second backup operation targeting the user asset, wherein the second trigger event specifies second metadata associated with the second backup operation;
    attempting to acquire a third byte-range lock associated with a second backup type specified in the second metadata in the asset lock file;
    making a first determination that the attempt to acquire the third byte-range lock was not successful; and in response to the first determination:
  attempting to acquire a fourth byte-range lock specified in the asset lock file that is associated with a storage unmounting operation;
    making a second determination that the attempt to acquire the fourth byte-range lock was successful; and
  in response to the second determination:
    unlocking the fourth byte-range lock on the asset lock file; and
    issuing a failure message, wherein content of the failure message is based on the second determination.

3. The method of claim 1, further comprising:
  detecting a second trigger event for a second backup operation targeting the user asset, wherein the second trigger event specifies second metadata associated with the second backup operation;
  attempting to acquire a third byte-range lock associated with a second backup type specified in the second metadata in the asset lock file;
  making a first determination that the attempt to acquire the third byte-range lock was successful; and
  in response to the first determination:
    acquiring the second byte-range lock, wherein acquiring the second byte-range lock comprises:
      making a second determination that the second byte-range lock is unlocked; and
      re-locking the second byte-range lock;
  making a third determination a mounting data object tracking backup storages mounted by the client device does not match backup storage mounting metadata specified in the second trigger event; and
  in response to the second determination:
    unlocking the second byte-range lock and the third byte-range lock;
    issuing a failure message, wherein content of the failure message is based on the second determination.

4. The method of claim 1, wherein the asset lock file comprises metadata descriptive of the first byte-range lock and the second byte-range lock.

5. The method of claim 1, further comprising:
  after performing the first backup operation:
    unlocking the first byte-range lock associated with the first backup operation;
    attempting to acquire byte-range locks for all operations for the user asset;
    making a determination that the attempt to acquire the byte-range locks was successful; and
    in response to the determination:
      unmounting the backup storage from the client device; and
      unlocking the byte-range locks.

6. The method of claim 1, further comprising:
  after performing the first backup operation:
    unlocking the first byte-range lock associated with the first backup operation;
    attempting to acquire all byte-range locks for all operations on the asset lock file; and
    making a determination that the attempt to acquire the byte-range locks was not successful.

7. The method of claim 1, wherein mounting the backup storage comprises:
  updating a mounting data object to include an entry for the backup storage.

8. A system, comprising:
  a processor;
  a client protection agent, which when executed by the processor performs a method, the method comprising:
    detecting a first trigger event for a first backup operation targeting a user asset of a client device of client devices, wherein the first trigger event specifies first metadata associated with the first backup operation;
    acquiring a first byte-range lock associated with a backup type specified in the first metadata in an asset lock file associated with the user asset;
    acquiring a second byte-range lock of the asset lock file that is associated with a storage mounting operation;
    after acquiring the first byte-range lock and the second byte-range lock, mounting a backup storage to the client device using the first metadata;
    unlocking the second byte-range lock; and
    performing, after unlocking the second byte-range lock, the first backup operation on the user asset.

9. The system of claim 8, wherein the method further comprises:
  detecting a second trigger event for a second backup operation targeting the user asset, wherein the second trigger event specifies second metadata associated with the second backup operation;
  attempting to acquire a third byte-range lock associated with a second backup type specified in the second metadata in the asset lock file;
  making a first determination that the attempt to acquire the third byte-range lock was not successful; and
  in response to the first determination:
    attempting to acquire a fourth byte-range lock specified in the asset lock file that is associated with a storage unmounting operation;
    making a second determination that the attempt to acquire the fourth byte-range lock was successful; and
    in response to the second determination:
      unlocking the fourth byte-range lock on the asset lock file; and
      issuing a failure message, wherein content of the failure message is based on the second determination.

10. The system of claim 8, wherein the method further comprises:
  detecting a second trigger event for a second backup operation targeting the user asset, wherein the second trigger event specifies second metadata associated with the second backup operation;
  attempting to acquire a third byte-range lock associated with a second backup type specified in the second metadata in the asset lock file;
  making a first determination that the attempt to acquire the third byte-range lock was successful; and
  in response to the first determination:
    acquiring the second byte-range lock, wherein acquiring the second byte-range lock comprises:
      making a second determination that the second byte-range lock is unlocked; and
      re-locking the second byte-range lock;
    making a third determination a mounting data object tracking backup storages mounted by the client device does not match backup storage mounting metadata specified in the second trigger event; and in response to the second determination:
  unlocking the second byte-range lock and the third byte-range lock;
  issuing a failure message, wherein content of the failure message is based on the second determination.

11. The system of claim 8, wherein the asset lock file comprises metadata descriptive of the first byte-range lock and the second byte-range lock.

12. The system of claim 8, wherein the method further comprises:
  after performing the first backup operation:
    unlocking the first byte-range lock associated with the first backup operation;
    attempting to acquire byte-range locks for all operations for the user asset;
    making a determination that the attempt to acquire the byte-range locks was successful; and
    in response to the determination:
      unmounting the backup storage from the client device; and
      unlocking the byte-range locks.

13. The system of claim 8, wherein the method further comprises:
  after performing the first backup operation:
    unlocking the first byte-range lock associated with the first backup operation;
    attempting to acquire all byte-range locks for all operations on the asset lock file; and
    making a determination that the attempt to acquire the byte-range locks was not successful.

14. The system of claim 8, wherein mounting the backup storage comprises:
  updating a mounting data object to include an entry for the backup storage.

15. A non-transitory computer readable medium comprising computer readable program code, which when executed by a computer processor enables the computer processor to perform a method, the method comprising:
  detecting a first trigger event for a first backup operation targeting a user asset of a client device of client devices, wherein the first trigger event specifies first metadata associated with the first backup operation;
  acquiring a first byte-range lock associated with a backup type specified in the first metadata in an asset lock file associated with the user asset;
  acquiring a second byte-range lock of the asset lock file that is associated with a storage mounting operation;
  after acquiring the first byte-range lock and the second byte-range lock, mounting a backup storage to the client device using the first metadata;
  unlocking the second byte-range lock; and
  performing, after unlocking the second byte-range lock, the first backup operation on the user asset.

16. The non-transitory computer readable medium of claim 15, wherein the method further comprises:
  detecting a second trigger event for a second backup operation targeting the user asset, wherein the second trigger event specifies second metadata associated with the second backup operation;
  attempting to acquire a third byte-range lock associated with a second backup type specified in the second metadata in the asset lock file;
  making a first determination that the attempt to acquire the third byte-range lock was not successful; and
  in response to the first determination:
    attempting to acquire a fourth byte-range lock specified in the asset lock file that is associated with a storage unmounting operation;
    making a second determination that the attempt to acquire the fourth byte-range lock was successful; and
    in response to the second determination:
      unlocking the fourth byte-range lock on the asset lock file; and
      issuing a failure message, wherein content of the failure message is based on the second determination.

17. The non-transitory computer readable medium of claim 15, wherein the method further comprises:
  detecting a second trigger event for a second backup operation targeting the user asset, wherein the second trigger event specifies second metadata associated with the second backup operation;
  attempting to acquire a third byte-range lock associated with a second backup type specified in the second metadata in the asset lock file;
  making a first determination that the attempt to acquire the third byte-range lock was successful; and
  in response to the first determination:
    acquiring the second byte-range lock, wherein acquiring the second byte-range lock comprises:
      making a second determination that the second byte-range lock is unlocked; and
      re-locking the second byte-range lock;
    making a third determination a mounting data object tracking backup storages mounted by the client device does not match backup storage mounting metadata specified in the second trigger event; and
    in response to the second determination:
      unlocking the second byte-range lock and the third byte-range lock;
      issuing a failure message, wherein content of the failure message is based on the second determination.

18. The non-transitory computer readable medium of claim 15, wherein the asset lock file comprises metadata descriptive of the first byte-range lock and the second byte-range lock.

19. The non-transitory computer readable medium of claim 15, wherein the method further comprises:
  after performing the first backup operation:
    unlocking the first byte-range lock associated with the first backup operation;
    attempting to acquire byte-range locks for all operations for the user asset;
    making a determination that the attempt to acquire the byte-range locks was successful; and
    in response to the determination:
      unmounting the backup storage from the client device; and
      unlocking the byte-range locks.

20. The non-transitory computer readable medium of claim 15, wherein the method further comprises:
  after performing the first backup operation:
    unlocking the first byte-range lock associated with the first backup operation;
    attempting to acquire all byte-range locks for all operations on the asset lock file; and
    making a determination that the attempt to acquire the byte-range locks was not successful.

* * * * *